United States Patent [19]
Williamson et al.

[11] Patent Number: 5,480,547
[45] Date of Patent: Jan. 2, 1996

[54] CORROSIVE LIQUID COALESCER

[75] Inventors: Kenneth M. Williamson, Jamesville; Scott A. Whitney, Marathon; Alan R. Rausch, Cortland, all of N.Y.

[73] Assignee: Pall Corporation, East Hills, N.Y.

[21] Appl. No.: 207,077

[22] Filed: Mar. 8, 1994

[51] Int. Cl.$^6$ .................................. B01D 17/02
[52] U.S. Cl. .................. 210/533; 210/540; 210/799; 210/DIG. 5
[58] Field of Search .............. 210/DIG. 5, 533, 210/540, 799

[56] References Cited

U.S. PATENT DOCUMENTS

| | | | |
|---|---|---|---|
| 3,966,603 | 6/1976 | Grant | 210/86 |
| 4,058,463 | 11/1977 | Bartik | 210/317 |
| 4,229,297 | 10/1980 | Nohmi et al. | 210/654 |
| 4,479,875 | 10/1984 | Nelson | 210/519 |
| 4,676,807 | 6/1987 | Miller et al. | |
| 4,716,074 | 12/1987 | Hurley | |
| 4,892,667 | 1/1990 | Parker, III et al. | 210/799 |
| 5,023,002 | 6/1991 | Schweizer et al. | 210/710 |
| 5,129,923 | 7/1992 | Hunter et al. | |
| 5,174,907 | 12/1992 | Chown et al. | 210/791 |
| 5,225,073 | 7/1993 | Billiet et al. | 210/121 |

FOREIGN PATENT DOCUMENTS

| | | |
|---|---|---|
| 1153430 | 5/1969 | United Kingdom . |
| 1287153 | 8/1972 | United Kingdom . |
| 2007520 | 5/1979 | United Kingdom . |
| 2273669 | 11/1993 | United Kingdom . |

OTHER PUBLICATIONS

L. Wadsworth, "Melt Blown Processing and Characterization of Fluoropolymer Resins", INDA Journal of Nonwovens Research, (1992).

*Primary Examiner*—Neil McCarthy
*Attorney, Agent, or Firm*—Leydig, Voit & Mayer

[57] ABSTRACT

A liquid purification system capable of separating a first liquid from a second liquid, in which the first liquid is a corrosive aqueous liquid that is wholly or partly immiscible in and forms a discontinuous phase with a second, continuous phase-forming organic liquid is provided including a housing, a fluid inlet in the housing, a first liquid outlet in the housing, a second liquid outlet in the housing, at least one coalescing assembly for coalescing the first liquid, and a liquid separating region in the housing. The coalescing assembly has at least one coalescing element which includes a halocarbon polymer packing material having a solid capture efficiency of as high as 20 μm, is substantially chemically inert to corrosive liquids and is adapted to separate liquids differing in interfacial tension of at least about 0.6 dynes/cm. A coalescing element for coalescing a first liquid from a second liquid, in which the first liquid is a corrosive aqueous liquid that is wholly or partly immiscible in and forms a discontinuous phase with the second, continuous phase-forming organic liquid is also provided which includes a halocarbon polymer packing material having at least one porous, fibrous, non-woven web. The web having a solid capture efficiency of as high as about 20 μm, and is adapted to separate liquids differing in interfacial tension of as low as 0.6 dynes/cm.

24 Claims, 2 Drawing Sheets

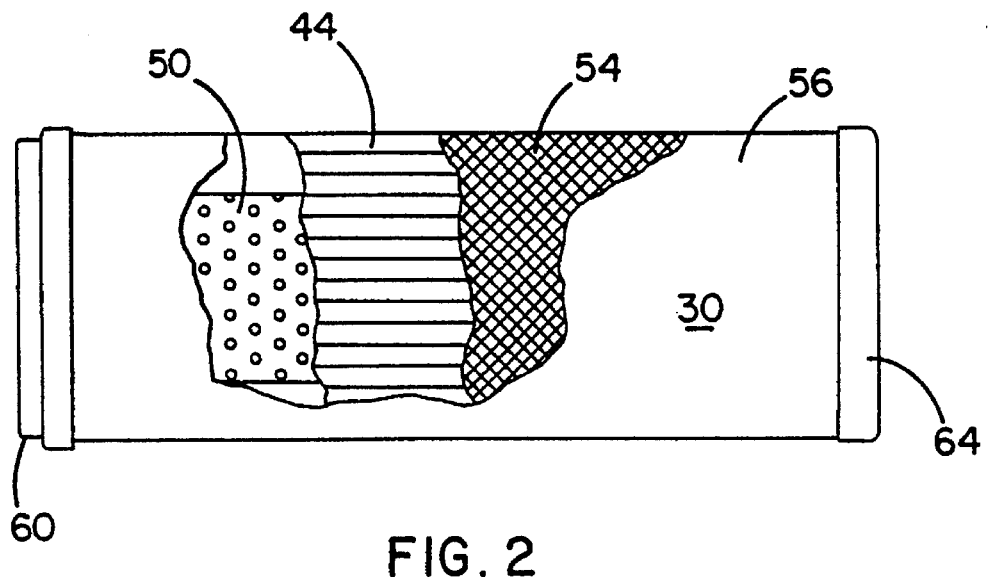
FIG. 2
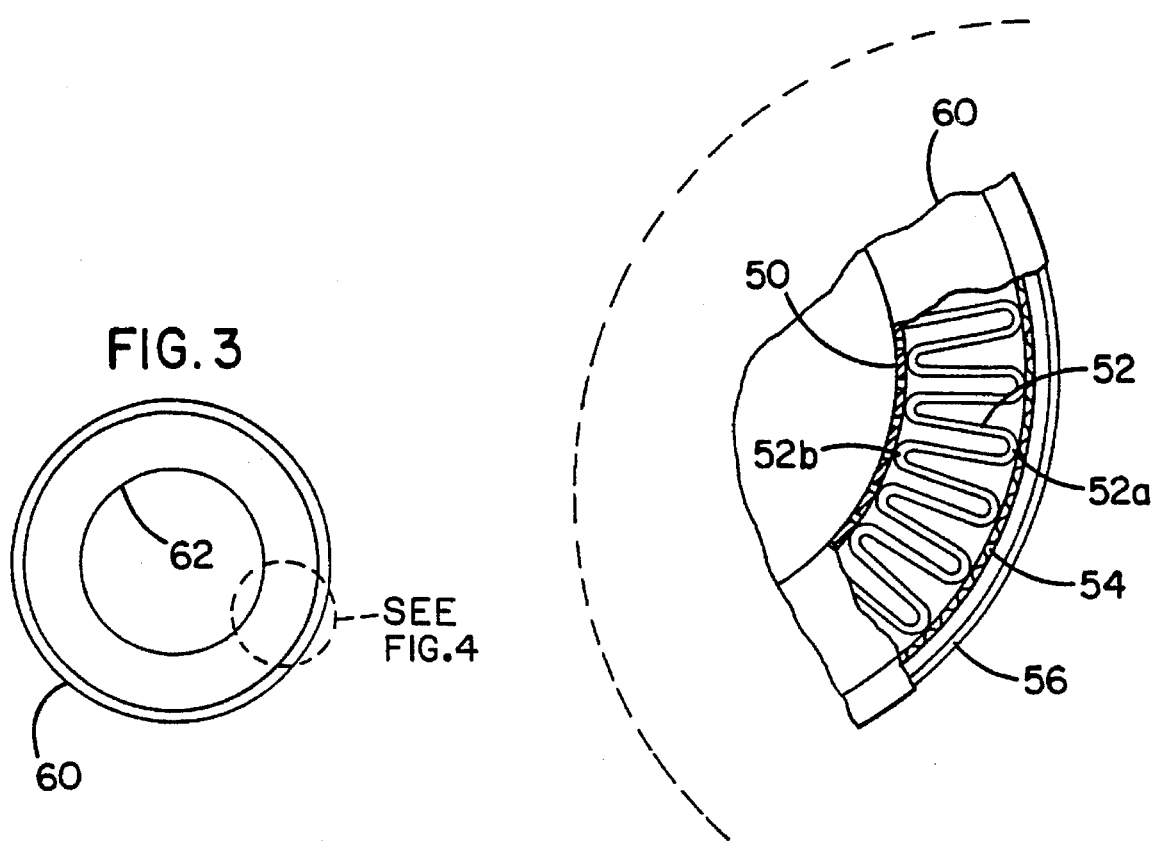
FIG. 3
FIG. 4

CORROSIVE LIQUID COALESCER

TECHNICAL FIELD

The present invention is directed to an apparatus and to a method of separating organic and aqueous phases in which at least one of these includes a corrosive material. More particularly, the present invention is directed to a method of separating corrosive aqueous solutions, most typically caustic solutions, from an organic phase, such as petroleum-based fractions and to an apparatus and a liquid purification system used therefor.

BACKGROUND OF THE INVENTION

Many industrial processes and apparatus, as well as household devices, involve the separation of a liquid phase from another phase. In some instances, particularly when water is the phase present in minor amounts, chemical means may be used to remove the water from the other components. Such means for removing moisture, however, require the replacement and/or regeneration of the reagents used in the process. The reagents employed and the products formed frequently introduce complications relating to handling and disposal. Because of the concomitant cost and, in some instances, inconvenience and potential adverse effects from exposure to chemical reagents which are associated with such processes, physical methods and apparatus have been preferred to chemical means for removal of small amounts of a liquid phase from other phases.

A method of coalescing an immiscible liquid suspended in another phase and a coalescing device, frequently termed a "coalescer", have found A method of coalescing an immiscible liquid suspended in another phase and a coalescing device, frequently termed a "coalescer", have found widespread use in removing liquid from both the gaseous phase, such as in aerosols, and from suspensions of one liquid in another liquid. Such devices are particularly effective where the volume of liquid removed is small in comparison to the volume of the phase from which it is removed. Typically, the equipment necessary to remove a liquid aerosol from a gas tends to be less complicated than that used to separate two liquid phases in which a first liquid phase is immiscible and suspended in a second liquid phase. This is generally true because in gas/liquid suspensions, gravitational effects tend to be more significant while surface energy, surface tension or interfacial tension effects tend to be less significant than with liquid/liquid suspensions.

The spectrum of applications where coalescers have been used to remove minor amounts of a first liquid phase, known as a "discontinuous phase" or "suspended phase", from a second liquid phase in which it is suspended, known as the "continuous phase" or "suspending phase", covers a considerable range of situations. For example, coalescers have been used most often to remove or separate small amounts of moisture from petroleum based fuels, including gasoline, diesel and aviation fuels, such as kerosene; to remove moisture from cleaning fluids; to separate oil from coolants and parts cleaners; to remove oil contamination found in natural bodies of water; to separate immiscible solvent systems used in extraction processes, etc.

Numerous mechanisms and models have been proposed to describe coalescence of a droplet of the discontinuous phase from the continuous phase and the ease or difficulty of separation of the immiscible phases. The factors which affect the coalescence process include the physical properties of the phases, such as density, viscosity, surface tension, shear rate, and interfacial tension (IFT). In addition, the properties of the system, such as drop size, curvature of the interface, temperature, concentration gradients and vibrations also affect coalescence significantly. While any or all of these factors may be significant in a particular situation, properties such as density, drop size and interfacial tension appear to be among the factors which are of most significance and often over which the least control can be exercised in difficult separations of two immiscible liquids. Thus, all other things being equal, where the densities of two liquids differ only slightly, separation becomes more difficult. This is also true of the interfacial tensions of the liquids involved. In those situations in which the droplets are greater than $10\mu$ (primary emulsions) coalescence and separation is much easier to effect frequently with the discontinuous phase settling by gravity after coalescence to form a heterogeneous layer. When the droplets are smaller than $10\mu$, particularly less than $1\mu$ in diameter, secondary emulsions or secondary hazes result from which the discontinuous phase is much more difficult to coalesce. The latter frequently occurs where the emulsion has been formed by rigorous agitation or the inclusion of a surface active agent. Where emulsification to form the secondary haze occurs purely by mechanical means, coalescence may be accomplished much more readily by conventional coalescence methods and apparatus. Where the secondary haze results from surface active materials, which influence the interfacial tensions of the liquids, separation becomes more difficult.

The type of coalescer employed depends on the difficulty of separation or coalescence, as influenced by the factors identified above. Thus, in some situations, equipment may be very simple, such as those employing baffles as the coalescing-effective material, and range to more complex devices containing different types of packing. The type of fluids being separated frequently determines the packing used. Thus, both the shape of the packing material and its composition influence the efficiency of coalescence and separation. For example, the coalescing apparatus conventionally used to separate oil and water typically contain tubes, plates, disks, spears, rods, fibers or other internal structures designed to capture oil. Conventionally, glass has been the most often used packing material and while in some instances membranes have been employed in coalescers, as well as the types of packing listed above, fibers have been the preferred form of packing. Currently, glass fibers seem to have found the most widespread application in coalescers.

Although the development of different types of apparatus, methods and materials has advanced liquid-liquid separation technology, particularly in the separation of aqueous-organic liquids, some problems have proven more difficult to solve and advances in the technology related thereto have been less forthcoming. This is particularly true with regard to certain separation problems involving petroleum-based materials and water or aqueous solutions. A major source of problems in the petroleum industry has involved the separation of water or aqueous solutions from petroleum based fuels such as diesel fuel, kerosene and gasoline either at the site of processing or subsequent thereto. One reason for difficulty in separating the water or aqueous solution (present in minor amounts as a discontinuous phase) suspended in the fuel, for example gasoline (the continuous phase), is that reagents added during processing to remove unwanted components or surfactants or detergents added at the end of processing to assist in maintaining the cleanliness of fuel combusting equipment in which it is used reduces the IFTs of the aqueous and organic phases. This makes the discontinuous, aqueous phase more dispersed in the organic phase and, therefore, more difficult to separate by most methods employed to separate liquid phases. Both of these difficulties share something in common in that water-soluble components result in a reduction of the IFT, and the current technique widely used for separation in each case is only partially successful, although these techniques are somewhat different.

The former problem, the removal of corrosive materials, such as the addition of a corrosive material during processing, up until now, has relied upon conventional technology and its concomitant shortcomings. More specifically, the problem relates to the separation and removal of corrosive materials, such as aqueous acidic- or caustic-containing materials from petroleum fractions. Thus, in the processing of petroleum, various fractions may be treated with strong aqueous acid and/or alkali-containing solutions, such as in the removal of certain compounds which are undesirable in fuels, for example, sulfur-containing compounds. In such instances, the petroleum fraction may be initially washed with a strong aqueous acid and subsequently neutralized with an excess of alkali. In other instances, an acid solution alone may be used to treat the petroleum-based material. Removal of both acidic and caustic aqueous phases has been somewhat difficult from an efficiency and equipment standpoint, with removal of caustic aqueous phases proving most difficult, particularly with respect to the corrosive effect on the equipment employed. The use of coalescing and separating equipment generally employed in other separations of aqueous and organic phases has been obviated because of the nature of the materials involved. Thus, the IFTs of the liquid phases are very similar. Up until recently, separations using a conventional type of coalescer have not been achieved with IFTs lower than about 3 dynes/cm. In addition, the corrosive nature of some acid and most caustic solutions has ruled out the use of many materials which otherwise could be used to manufacture the processing equipment, including many metals.

Since effective coalescers which are resistant to corrosive materials, particularly, caustic substances have been unavailable, heretofore, the most effective technology available to the petroleum industry to remove caustic from hydrocarbon fuels, has been for decades, and continues to be, a sand bed filter. While being referred to as filters, and functioning at least in part as such, these devices may also be loosely categorized as functioning as coalescers. They are, however, different in most respects from coalescers currently being used in most other applications. These are massive filters having volumes on the order of about 5000 to about 7000 cubic feet. Not only are such filters extremely large, but they also are expensive to build and maintain. It is generally not practical to attempt to clean the sand and both the sand and some other components of the filter are routinely removed and disposed of. Since many of the components cannot withstand the long-term exposure to the caustic environment, occasionally entire sand bed filter systems must be replaced at a large capital cost.

In view of these problems, methods and apparatus have been sought which will allow the separation of aqueous and organic liquid phases where the differences between the IFTs of each phase is very low. A method and apparatus have also been sought to separate a corrosive aqueous phase, particularly a caustic-containing aqueous phase, from a substantially water-insoluble phase which, when compared to currently used techniques in the petroleum industry, permits the use of apparatus having a smaller volume, equivalent or greater efficiency, equivalent or lower initial capital investment and lower labor and replacement related maintenance costs.

Since the separation of aqueous solutions used in processing steps in the petroleum industry are frequently performed at or involve petroleum fractions at elevated temperatures, the method and apparatus should be capable of performing effectively at elevated temperatures.

SUMMARY OF THE INVENTION

The present invention is directed to a coalescing apparatus which overcomes many of the shortcomings of conventional methods of separating an aqueous phase from a water-immiscible organic phase. As used herein, a "water-immiscible organic phase" (WIOP) refers to an organic phase which, when combined with pure water would be considered, by most chemists, to be immiscible with or substantially insoluble in the water. The presence of a surfactant, such as a detergent, tends to lower the IFT of the two phases and cause increased dispersion or solubility in the WIOP. As used herein, the term "caustic" refers to any strongly alkaline material, most typically the type used in the petroleum industry. While the WIOP may refer to any organic phase generally considered to be immiscible in pure water, in the context of the present invention, it typically refers to the preferred embodiment relating to separations of petroleum-based liquids.

The present invention is directed to a method of separating an aqueous phase, preferably a corrosive substance-containing aqueous phase, from a WIOP and to an apparatus used therefor. Preferred embodiments of the present invention involve methods and apparatus in which the purification relates to a WIOP that includes at least one petroleum fraction and the aqueous phase includes at least one caustic substance. Either the WIOP or the aqueous phase may be the discontinuous phase, but the aqueous phase is typically, and preferably, the discontinuous phase present in minor amounts.

The apparatus of the present invention, on a volume basis, is more compact than conventional sand bed filtration systems currently employed for separation of caustic-containing aqueous phases from petroleum fractions, typically a diesel fraction. For example, a typical sand bed filter system used by the petroleum industry to process liquid at a rate of 1300 gal/min (4920 l/min) occupies a volume of between about 5,000 to 7,000 cubic feet (about 142 to about 198 cubic meters). In contrast, the volume occupied by the housing of coalescing apparatus of the present invention, used for the same purpose and typically capable of processing about the same volume of liquid in the same amount of time, typically occupies a volume of about 80 to about 140 cubic feet (4 cubic meters). Each dimension of the apparatus according to the present invention is smaller than a comparable dimension of a sand bed filter vessel used to process the same volume of liquid.

The method and apparatus of the present invention are capable of removing proportionally larger amounts of the aqueous phase than conventional methods, particularly when compared to sand bed filters and thereby are capable of producing petroleum fractions having lower aqueous phase concentrations. While performing more efficiently at or close to ambient temperatures, the method and apparatus of the present invention are also capable of operating at elevated temperatures, such as those encountered at various outlet sites in a petroleum-fractionating system when petroleum fractions are produced, without substantial deterioration of the components of the apparatus.

The liquid purification system of the present invention which is capable of producing the aforementioned results includes a housing having a liquid inlet and first and second liquid outlets. The housing is also provided with a region for separation of a coalesced liquid. Provided within the housing, located intermediate the liquid inlet and one of the liquid outlets, is at least one coalescing element (also referred to herein as "coalescing cartridge", "coalescing unit", "coalescer" or like term). Preferably, the coalescing element(s) is located outside of the region provided in the housing for separation of the liquids, the region preferably provided for separation by gravity. At least one of the coalescing elements employed includes a packing material for coalescing the discontinuous phase. The preferred packing material is porous, preferably a fibrous web and is preferably formed from a halopolymer, most preferably a fluoropolymer.

Another aspect of the present invention relates to a method of separating a discontinuous phase liquid, such as water or an aqueous liquid, preferably a corrosive aqueous liquid from a WIOP, such as petroleum fraction. Although this represents the type of liquid purification for which the present invention is expected to have the most widespread application, it should not be construed as being limited thereto and embodiments of the apparatus and method of the invention may be used to separate other substantially immiscible liquids in which there is a discontinuous organic phase (such as a petroleum fraction) and a continuous aqueous phase. The method involves introducing a mixture of the discontinuous and continuous phase liquids to at least one coalescing element including a halopolymer and thereafter separating the liquid phases, most typically, by gravity separation. Under certain conditions, a separator may be used. The liquid having the greater density emerges from one of the housing liquid outlets while the liquid having lower density emerges from the other liquid outlet in the housing.

BRIEF DESCRIPTION OF THE DRAWINGS

FIG. 2 is a plan view with a partial cutaway of an embodiment of a coalescing element of the present invention.

FIG. 3 illustrates an end cap of the embodiment of a coalescing element shown in FIG. 2.

FIG. 4 illustrates an enlarged portion in partial cutaway of the end cap shown in FIG. 3.

DESCRIPTION OF THE PREFERRED EMBODIMENTS

Figure 1:
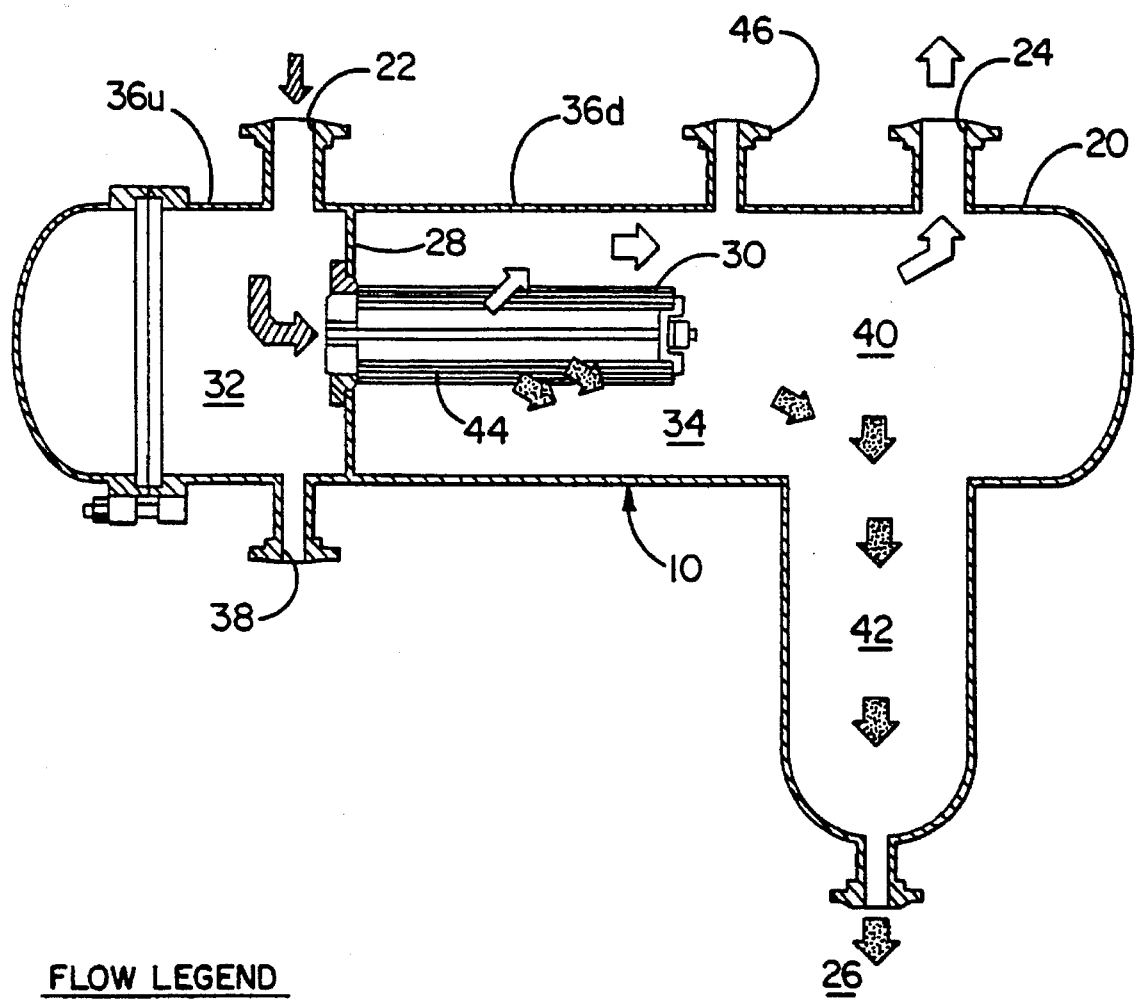
FIG. 1 is a sectional view of one embodiment of the present invention.

In describing the present invention, terms such as "coalescer", "coalescing element", "coalescing unit" and like terms, in both singular and plural, have been used to describe the device or article which coalesces the discontinuous or polydivided phase of a mixture of immiscible liquids to form droplets. Regardless of the term used, the coalescing step employing such device always occurs in the same manner. While the term "coalescer" generically describes such a device and the term "coalescing element" describes one component unit or cartridge of a system which may contain multiple coalescing units, the present invention may be construed as containing as few as one coalescer unit in a coalescer system to a plurality of such units. In addition, such coalescing units may be fixed and not removable (without doing significant damage to the system), or preferably, contain easily removable and replaceable elements.

In its simplest form, the present invention may include a single coalescing element or coalescer, while a plurality of coalescing elements may be used for mixtures having low IFTs or to process large volumes of liquid. Also, in its simplest form, the medium which serves as the functional portion of the packing or liquid coalescing portion of the coalescer may be provided in porous sheet or web form. The porous sheet may be arranged as a single sheet or as a plurality of such porous sheets either in flat or planar form or in some other configuration. Thus, a flat coalescing element could be arranged within the housing intermediate the housing inlet and the housing outlets. When more than a single flat web or sheet are employed, they may be arranged in spaced relationship to one another or, preferably, in contact with one another, again, intermediate the housing inlet and housing outlet. The sheets may also be arranged in pleated or corrugated form in which the peaks and troughs of each sheet lie in planes parallel to one another. Preferred configurations of the coalescer element include a cartridge in which the packing is arranged in a cylindrical configuration, such as that shown in FIGS. 1 and 2. With this configuration, the sheets may also be either pleated or non-pleated. Since a corrugated configuration provides greater surface area to the packing material, it is generally preferred. Where multiple sheets are employed in a cylindrical element, the sheets are preferably arranged in a superposed or series orientation and in contact with one another proceeding in a radial direction from the upstream to the downstream direction of the fluid flow path. In addition to one or a plurality of flat sheets or mats, one or a plurality of cylindrical sheets or mats, one or a plurality of cylindrical pleated sheets or mats, the latter being a preferred embodiment, the packing or coalescing portion of the element may also be arranged as a single helically wound sheet or mat or a single spirally wound sheet or mat. Thus, while but a single sheet may be employed, a multi-layered cross-section can be produced. Although in some instances, membranes may be used as the packing of the coalescing element, both because of cost considerations and a high pressure drop across the packing ($\Delta P$) resulting from using such membranes, fibrous materials are preferably used. Preferably non-woven webs of the fibrous material are employed. Typically the fibers are formed from a thermoplastic material and the webs are non-woven melt blown webs.

Materials suitable as the packing material or coalescing functional portion of the coalescing element are materials having a "critical wetting surface tension" (CWST) (defined in detail below) intermediate the surface tensions of the liquids or liquid phases to be coalesced.

A series of liquids can be prepared, each with a surface tension of about 3 dynes/cm higher compared with the one preceding. A drop of each may then be placed on a porous surface and observed to determine whether it is absorbed quickly, or remains on the surface. For example, applying this technique to a 0.2 micrometer porous polytetrafluoroethylene (PTFE) filter sheet, instant wetting was observed for a liquid with a surface tension of 26 dynes/cm. However, the structure remains unwetted when a liquid with a surface tension of 29 dynes/cm is applied.

Similar behavior is observed for porous media made using other synthetic resins, with the wet-unwet values dependent principally on the surface characteristics of the material from which the porous medium is made, and secondarily, on the pore size characteristics of the porous medium. For example, fibrous polyester, specifically polybutylene terephthalate (hereinafter "PBT") sheets, which have pore diameters less than about 20 micrometers, were wetted by a liquid with a surface tension of 50 dynes/cm, but were not wetted by a liquid with a surface tension of 54 dynes/cm.

In order to characterize this behavior of a porous medium, the term "critical wetting surface tension" (CWST) has been defined as described below. The CWST of a porous medium may be determined by individually applying to its surface, preferably dropwise, a series of liquids with surface tensions varying by 2 to 4 dynes/cm, and observing the absorption or non-absorption of each liquid. The CWST of a porous medium, in units of dynes/cm, is defined as the mean value of the surface tension of the liquid which is absorbed and that of a liquid of neighboring surface tension which is not absorbed. Thus, in the examples of the two preceding paragraphs, the CWST's are, respectively 27.5 and 52 dynes/cm.

In measuring CWST, a series of standard liquids for testing are prepared with surface tensions varying in a sequential manner by about 2 to about 4 dynes/cm. Ten drops of each of at least two of the sequential surface tension standard liquids are independently placed on representative portions of the porous medium and allowed to stand for 10 minutes. Observation is made after 10 minutes. Wetting is defined as absorption into or obvious wetting of the porous medium by at least nine of the ten drops within 10 minutes. Non-wetting is defined by non-absorption or non-wetting of at least nine of the ten drops in 10 minutes. Testing is continued using liquids of successively higher or lower surface tension, until a pair has been identified, one wetting and one non-wetting, which are the most closely spaced in surface tension. The CWST is then within that range and, for convenience, the average of the two surface tensions is used as a single number to specify the CWST.

Appropriate solutions with varying surface tension can be prepared in a variety of ways, however, those used in the development of the product described herein were:

TABLE 1

| Solution or fluid | Surface Tension, (dynes/cm) |
| --- | --- |
| Sodium hydroxide in water | 94–110 |
| Calcium chloride in water | 90–94 |
| Sodium nitrate in water | 75–87 |
| Pure water | 72.4 |
| Acetic acid in water | 38–69 |
| Ethanol in water | 22–35 |
| n-Hexane | 18.4 |
| FC77 (3M Corp.) | 15 |
| FC84 (3M Corp.) | 13 |

Suitable as the packing material of the present invention are polymers formed from halocarbons, that is, polymers in which at least some hydrogen atoms of a polyolefin (or hydrocarbon polymer) have been replaced with halogen atoms. Most typically such halocarbon polymers are formed by polymerizing a halogen-containing alkylene or by copolymerizing such a halogen-containing alkylene with another ethylenically unsaturated hydrocarbon or halogen-containing alkylene. Preferred are fluorocarbon polymers or fluoropolymer resins containing one or more types of halogen atoms, at least one of which is fluorine. Preferred are mixed fluoropolymer resins, that is, fluorocarbon resin polymers containing fluorine and at least one other halogen atom, preferably chlorine. Examples of such fluoropolymers include ethylene chlorotrifluoroethylene copolymer (ECTFE), fluorinated ethylene propylene (FEP), polyvinylidene difluoride (PVDF) and Teflon® polymers including polytetrafluoroethylene (PTFE) and fluorinated ethylene perfluoroalkyl vinyl ether copolymer resin or perfluoroalkoxy polymer, $[CF_2\text{-}CF\text{-}(O(CF_2)CF_3)\text{-}CF_2\text{-}CF_2]$. Preferred are PTFE materials such as membranes known as EMFLON, available from Pall Corporation, Glen Cove, N.Y., U.S.A. Another preferred PTFE material is formed from FEP resins, and PTFE fibers, particularly those in a fluorocarbon binder such as FEP (as described by Hurley in U.S. Pat. No. 4,716,074, incorporated herein by reference). Most preferred is ECTFE. This material is available from Ausimont USA, Inc. in Morristown, N.J., as "Halar®".

Although, as suggested above, the packing of a coalescer can take many forms, membranes (generally when PTFE is used) and fibrous webs are preferred, with the latter being most preferred, regardless of material. The webs or sheets of packing material may be woven or non-woven, with the latter being preferred. The fibers may be mechanically intertwined or bonded to one another with point to point bonds. The former is preferred, particularly when the preferred non-woven web of ECTFE is employed as the packing.

Parameters such as fiber diameter and capture efficiency are selected based on the type of separation to be accomplished. To achieve separation of liquids having IFTs of below 30 dynes/cm, the packing medium employed should have a solid capture efficiency of preferably not more than about 20 microns. Accordingly, for most applications of the present invention, the solid capture efficiency should not be more than about 20 microns. The solid capture efficiency is determined in large part by the pore size of the medium, which is itself largely determined by the fiber diameter. Thus, the average pore size of a fibrous medium generally is no smaller than the diameter of the fibers employed. For the types of separations which the present invention is expected to have most widespread application, typically, the fibers will have diameters of less than about 10 microns, preferably less than about 7 microns, and most preferably, the fiber diameters are less than about 5 microns.

The preferred embodiment of the present invention employs at least one coalescing element in which the preferred packing material, ECTFE nonwoven, fibrous, fluoropolymer webs, are coaxially arranged in a corrugated, cylindrically configured coalescing element. While a single sheet of the fluoropolymer packing, particularly ECTFE, may be used, the number of sheets or layers of webs depends on various factors including the thickness of the layer, the average ΔP, the average pore diameter, the basis weight of the material, the bubble point of the material, the fiber diameter, the discontinuous phase concentration (amount of discontinuous phase to be removed), and the volume and rate of liquid passing through the coalescer. What is generally more important than the thickness of a single sheet or web or the number of sheets or layers of web employed is the total depth of the bed, also known as the "total medium composite thickness". In applications where corrosive aqueous liquids are being removed and IFTs are low, particularly in the separation of caustic-containing aqueous liquids, from WIOPs such as petroleum based substances, the total medium composite thickness is suitably about 0.05 to about 0.2 inch (about 0.127 cm to about 0.508 cm), preferably about 0.1 inch (about 0.254 cm). From about 1 to about 20 layers of fluoropolymer packing may be arranged radially and coaxially in the coalescing element. Preferably, each element includes 1 to about 14 layers of packing material. Most preferably, a corrugated, cylindrically configured coalescing element includes about 7 layers of ECTFE, each having a thickness of about 0.014 inches (for a total of about 0.1 inches) and a capture efficiency of about 20μ.

Preferably the non-woven, mechanically intertwined ECTFE fluoropolymer web has a single layer medium weight of about 3 ounces per square yard (about 112 gms/m$^2$). The total medium weight for 7 layers of this material is about 21 ounces/yard$^2$ (about 781 gms/m$^2$). The fiber diameter of the ECTFE fiber is suitably about 1 to about 10 microns, preferably about 1 to about 7, and most preferably about 1 to about 5 microns.

Suitable materials from which the components of the coalescing cartridge may be formed, such as the end caps, core, cage, and seals, include materials such as epoxy adhesive materials, carbon steel or stainless steel, teflon, and other fluoropolymers with stainless steel being most preferred. The housing itself, within which the coalescing element(s) is located, may be formed from materials such as carbon steel, and stainless steel, with carbon steel being most preferred.

While the liquid purification systems of the present invention are most effective at or close to ambient temperatures, they are also quite effective at elevated temperatures. Thus, they are capable of effectively removing corrosive aqueous liquids found in many petroleum fractions as a result of the processing treatment which the fractions undergo either at the site of the fractionating plant or remote from the plant. Typically, many of these fractions are transferred to devices for removal of the aqueous phase, such as the present invention, at the fractionating plant at temperatures of about 80° to about 90° F. (about 26.5 to about 32° C.). In many instances, the temperature of these liquids is in excess of 100° F. (38° C.). Not only do the liquid purification systems of the present invention provide efficient separation of corrosive aqueous phases from a WIOP, but the materials from which the various elements of the purification system are made are highly resistant and show little adverse effects from the corrosive nature of the liquids employed. Thus, either at ambient or elevated temperatures, at which both acidic and caustic materials demonstrate their most corrosive nature, the purification system of the present invention is capable of withstanding such adverse conditions.

The liquid purification systems of the present invention, and particularly the packing materials employed in the coalescing elements of the present invention, in contrast to the materials employed as packing materials in conventional coalescing elements, may be used in separating corrosive materials found both in the aqueous phase as well as the WIOP. This includes both weak acids and strong acids, as well as weak and strong alkaline substances, both inorganic and organic. While not wishing to be limited thereto, examples of substances which the system and method of the present invention are capable of removing include, but are not limited to, aqueous solutions of mineral acids such as $H_2SO_4$, $HNO_3$, $H_3PO_4$, HCl, HF, organic acids such as phenol, cresols, and other phenolic derivatives, benzene sulfonic acid or p-toluene sulfonic acid, etc. and alkaline substances such as NaOH, KOH, $NaCO_3$, $Na_2HPO_4$, $Na_3PO_4$, $NH_4OH$, quaternary ammonium hydroxides, etc.

With a particular WIOP and aqueous phase containing a specific substance dissolved therein which alters the surface tension and IFT, the IFT of the two phases varies inversely with the concentration of the dissolved substance. Thus, aqueous phases containing high concentrations of surfactants or corrosive materials are generally more difficult to separate by a coalescing procedure than are similar two phase systems containing lower concentrations of the dissolved material. While not the only consideration, the present invention is effective for separating corrosive aqueous phases from WIOPs in which the IFT of the mixture is at least about 0.6 dynes/cm. Thus, the present invention is capable of achieving separations of liquid phases with IFT values significantly lower than is currently available with other coalescing systems or purification systems generally. To appreciate the significance of this in terms of typical situations, this corresponds to separating an aqueous phase containing sodium hydroxide from a petroleum fraction, such as a light naphtha fraction, in which the concentration of the dissolved sodium hydroxide, by weight, is about 10%. This also corresponds to a value on the Baumé scale of about 14.2° Baumé.

Table 2 indicates the IFT at room temperature for a continuous phase of a light naphtha and an aqueous phase containing dissolved sodium hydroxide for various concentrations, by weight, of sodium hydroxide.

TABLE 2

| Concentration of NaOH (% by weight) | IFT (dynes/cm) |
| --- | --- |
| 0.1 | 23 |
| 0.5 | 20.5 |
| 1% | 17.8 |
| 5% | 2.0 |
| 10% | 0.6 |

Embodiments of the present invention are described below with respect to FIGS. 1 to 4. However, the invention should not be construed as being limited thereto.

The purification apparatus represented generally by reference numeral 10 in FIG. 1 includes a housing 20 provided with a liquid inlet 22, a first liquid outlet 24 and a second liquid outlet 26. The housing is also provided with a vertical tubesheet 28 in which is fitted one or more coalescing elements 30. When a plurality of coalescing elements is employed, they are arranged in parallel, each being held in an opening provided in the tubesheet 28. Each of the coalescing elements is sealingly secured within the opening provided for it in the tubesheet. Although not shown in FIG. 1, various support or securing means, such a spider support may be provided at the end of the coalescing cartridge(s) remote from the inlet end and tubesheet for supporting and securing the coalescing element(s) in the housing. Not only does the tubesheet 28 act to secure one end of each coalescing element 30 provided therein, but it also serves as a barrier or wall between an upstream or inlet side 32 of the housing 20 and a downstream or outlet side 34 of the housing. The inlet side 32 of the housing 20 may also be considered an inlet chamber defined by a wall 36u and the tubesheet 28. The chamber may also be provided with a drain outlet 38 for residual contaminated liquid remaining in the inlet chamber 32 after the purification procedure is terminated. Normally, while the purification procedure is in progress, the drain 38 is closed such that all contaminated liquid passing into the housing through inlet 22 passes from the upstream side 32 of the housing to the downstream side 34 of the housing through the one or more coalescing elements 30 provided in the tubesheet 28 (as represented by the solid black arrows in FIG. 1). The contaminated liquid passes into the coalescing element 30, which is located substantially in the downstream side of the housing through an opening provided in the end cap 62 (FIGS. 3 and 4) secured in the tubesheet 28 and passes out of the coalescing element through the packing material 44 which defines the cylindrical wall of the coalescing element 30. In the preferred embodiment, a fibrous, non-woven web of ECTFE, known as HALAR® 1400, is used as the packing. Thus, the liquid flows from the upstream side 32 of the housing to the downstream side 34 of the housing through the coalescing element(s) 30 in an "inside-out" direction. The downstream side 34 of the housing may also be thought of as a large chamber defined by the tubesheet 28, coalescing element 30 and wall 36*d*.

FIGS. 2 to 4 illustrate an embodiment of a coalescing element or cartridge suitable for use in the present invention. FIG. 2 illustrates the cartridge in partial cutaway to reveal some of the component parts of the cartridge. FIG. 4, which shows an enlarged portion of the end cap illustrated in FIG. 3, in partial cutaway, also reveals some of the component parts of the cartridge. Thus, the packing 44 is arranged around a perforated core 50. The packing is configured in a corrugated or pleated arrangement 52 having peaks 52*a* and troughs 52*b*. Concentrically arranged surrounding the pleated packing is a spiral mesh wrap 54, preferably formed from metal. A similar support layer (not shown) may be provided intermediate the core 50 and the packing 44. The upstream and downstream support layers assist in retaining the shape of the packing medium during use. Surrounding the outer spiral metal mesh wrap 54, arranged as a concentric sleeve, is a downstream drainage layer 56 which provides improved droplet release. FIGS. 3 and 4 illustrate an end cap 60 sealed on one end of the coalescing cartridge 30. This end cap is provided with an opening 62 located at the center of the cap. The opening, under typical use applications, is provided as a fluid inlet, with the fluid being treated passing out of the element through the packing 44. A similar, but non-perforate, end cap 64 is provided at the opposite end of the cylindrical cartridge. In some instances the coalescing cartridge may be constructed with end caps in which each has an opening therein, and, in some cases they may be identical. This reduces manufacturing costs and also allows the use of a tie rod passing through the cartridge and secured at the end remote from the inlet end with a nut and flange or the like. This provides additional stability in mounting within the housing (as shown in FIG. 1). Alternatively, a plug may be inserted in the end of the cartridge remote from the inlet end. Such cartridges may also be arranged in series or as one long cartridge with appropriate connectors or adapters.

The liquid emerging from the coalescing element(s) passes into a separating region 40 of the housing provided in the downstream side of the housing, downstream of the coalescing element. In research directed to the present invention, it has been found that under certain situations a separating element (not shown) may be provided downstream of the coalescing element in the separating region.

When a separator is employed, it may have the same or a similar configuration as those indicated above for the coalescing elements. The separator may employ materials used in conventional separating elements. One example of a suitable separating element is described in copending U.S. patent application Ser. No. 08/038,231, incorporated herein by reference. When a cylindrical configuration is employed, fluid flow is in an outside-in direction. When used, the number and arrangement of separating elements may vary with the application. Thus, with the use of a plurality of coalescing elements, typically a plurality of separating elements may be used downstream thereof. In such instances, a second tubesheet is provided in the separating region of the housing as a barrier and to hold the separating element(s) therein such that liquid flow proceeds in an "outside-in" direction.

It has been found that for separations of some corrosive aqueous solutions from WIOPs, such as petroleum fractions, the use of a separating element downstream of the coalescing element in the present invention is effective. However, for many mixtures, particularly those containing caustic substances soluble in the aqueous phase, the use of a separating element has an adverse effect. That is, the separating element causes the coalesced droplets of the aqueous phase to redisperse in the organic phase. Thus, use of a separating element is ineffective when the IFT of the mixture falls below 3 dynes/cm (i.e. from about 0.6 to below 3.0 dynes/cm) as measured by the Denoyes Ring Pull Method. In those situations, gravity separation is employed. In such situations, it has been found that gravity separation proves more effective than the use of a separating element. It has been determined that for separation of a corrosive liquid, such as aqueous caustic and a WIOP, such as a petroleum fraction, the difference in specific gravity for each phase should be at least about 0.1 for effective gravity separation to take place.

While the use of a gravity separation procedure requires a volume of the separating region 40 of the housing to be somewhat larger than where a separating element is employed, the overall volume of the housing is still minuscule in comparison to the volume of a typical sand bed filter used to process equivalent volumes of liquid in the same period of time.

In the embodiment of the invention shown in FIG. 1, a discontinuous phase collection region 42 is provided within the housing in fluid communication with the separation region 40. In an embodiment of the invention, such as that illustrated in FIG. 1 in which a major portion of the housing has a cylindrical configuration and the longitudinal axis passing through the cylindrical configuration is arranged horizontally, the discontinuous phase collection region 42 is provided at a lower portion of the housing when the discontinuous phase has the higher density of the two phases being separated. This is the preferred position for removal of an aqueous discontinuous phase from an organic phase having a density lower than water, such as a petroleum fraction. In such instances, the organic phase rises to the upper portion of the separation region 40 and is removed through outlet 22.

In addition to the elements of the purification system discussed above, the housing may also be provided with an air vent 46 on the upstream side 32 and/or downstream side 34, preferably the downstream side 34, of the housing to remove air and/or other gases entering the system. Various closure means, such as hatches and appropriate seals may be provided in the system to allow access to internal parts of the housing for cleaning and/or removal of component parts such as a coalescing element.

A prefilter for removal of solid contaminants may be incorporated upstream of the coalescing element. The prefilter may be incorporated in the upstream side 32 of the housing, the housing inlet 22, or, more preferably, upstream of the housing itself. Suitable prefilters are formed from stainless steel, fluorocarbon or polyphenylene sulfide. (Ryton, available from Phillips Chemical Co.). In situations such as the removal of a caustic-containing aqueous phase from a petroleum fraction, the filter material should have an average pore size of about 15 to about 30 microns, preferably about 18 microns.

The operation of the purification system according to the present invention is described, by way of example and with reference to FIG. 1, as follows. A contaminated liquid product, such as a mixture of an aqueous phase and a WIOP, for example, a caustic-containing phase and a petroleum fraction, is fed to the inlet 22 of the housing 20. The contaminated liquid enters the upstream side 32 of the housing (or inlet chamber) and passes into the opening provided in the upstream side of the coalescing element 30. The liquid in the coalescing element then passes through the packing 44 which forms the wall of the coalescing element to emerge therefrom as a substantially uncontaminated petroleum fraction (indicated by solid white arrows in FIG. 1) and coalesced droplets of the aqueous phase (indicated by the dotted arrows) of sufficient size to form an unstable suspension or dispersion in the petroleum fraction. After emerging from the coalescing element 30, the droplets of the aqueous phase continue to grow in size by further coalescing due to gravity separation. The size of the caustic-containing water droplets continues to grow as the droplets diffuse downwardly and away from the coalescing element. At the same time, the lower density organic phase diffuses upward in the housing and passes out of the outlet 24. The aqueous phase collects in the discontinuous phase collection region 42 and is drawn off through the second outlet 26.

To demonstrate the effectiveness of the liquid purification system according to the present invention, a pilot scale system according to the present invention was constructed and compared with a conventional sand bed purification system. The volume of the sand bed system was 6,810 ft³ (193 m³), while that of a full size equivalent to the housing of the pilot scale device used containing the coalescing unit according to the present invention was about 100 ft³ (283 m³). The actual housing had an internal diameter of 4 in. (0.1 m) and a length of 32 in. (0.81 m) with a volume 402 in.³ (0.0066 m³). The housing included a single coalescing element according to the present invention, having the dimensions of 2.75 inches internal diameter×6 inches, while the full size equivalent would include 33 coalescing elements arranged in a parallel arrangement. Each coalescing element included a packing formed from Halar® fluoropolymer resin, available from Ausimont USA, Inc. Morristown, N.J. The non-woven fluoropolymer mats used as the packing had a single layer medium weight of approximately 3 ounces per yard and an ideal fiber diameter of approximately 9 microns. The coalescing cartridge employed 7 layers of packing, each having a thickness of 0.014 inches. The average Air ΔP for the single layer of medium was 0.28 inches (0.71 cm) of water at a velocity of 28 ft/min (8.5 m/min). The average first bubble point (largest pore size) (single layer) was 8 inches (20 cm) of water, and the 1,500 cc bubble point (mean pore bubble point) (single layer) was an average of 8.7 inches (22 cm) of water. The medium in each coalescing element was supported both on the upstream and downstream side of the packing by a single layer of stainless steel metal mesh, to avoid loss of shape of the packing medium due to the liquid passing through the coalescing element. Each coalescing element also included a wrap circumferentially arranged downstream of and surrounding the outer metal mesh. This final downstream element served as an outer drainage layer and was formed from an open pore PTFE resin having an average pore size of at least 40μ. A prefilter formed from stainless steel or ECTFE and having a pore size of 18 microns was located upstream of the housing of the purification system of the present invention.

A petroleum fraction consisting of a contaminated light cat. naptha was supplied to both the sand bed filter and the liquid purification system of the present invention by means of a flow splitter at a flow rate of 1.25 gallons/min from a 1,300 U.S. gallons/minute (slows on liters/minute). The contaminant present in the naphtha fraction was an aqueous caustic composed of aqueous NaOH. The temperature and the concentration of the influent varied over time as did the effluent from both the coalescing system of the present invention and the sand bed apparatus. The comparison study was conducted over an 11 week period also with the results for each week averaged and the results over the entire 11 week period averaged. These results are presented in Table 3. In the last column of the table, the results for the two methods are compared using a ratio of the effluent from the sand bed apparatus to that obtained with the coalescing apparatus of the present invention. As it may be seen from the results, the improvement ranged from a low of about a 30% improvement for week number 5 to an improvement of over 30 times for week number 10. The average performance factor for the 11 week period was 8.33.

TABLE 3

| Week | NaOH Influent (mg/l) | Coalescer Effluent (mg/l) | Sand Bed Effluent (mg/l) | Performance Factor (S/C) |
|---|---|---|---|---|
| 1 | 3.71 | .096 | .99 | 10.31 |
| 2 | 2.06 | .31 | .48 | 1.54 |
| 3 | 32.75 | .60 | 1.65 | 2.75 |
| 4 | 7.98 | .11 | .57 | 5.18 |
| 5 | 53.36 | 1.28 | 1.69 | 1.32 |
| 6 | 58.26 | .57 | 1.55 | 2.72 |
| 7 | 42.86 | .53 | 1.60 | 3.02 |
| 8 | 49.60 | .18 | 2.18 | 12.11 |
| 9 | 26.59 | .43 | 2.67 | 6.22 |
| 10 | 49.32 | .19 | 6.09 | 32.05 |
| 11 | 22.05 | .23 | 3.32 | 14.43 |
| 11 week average | 34.64 | .41 | 2.07 | 8.33 |

What is claimed is:

1. A liquid purification system capable of separating a first liquid from a second liquid, in which the first liquid is a corrosive aqueous liquid that is wholly or partly immiscible in and forms a discontinuous phase with a second, continuous phase-forming organic liquid comprising:

(a) a housing;

(b) a fluid inlet in said housing;

(c) a first liquid outlet in said housing;

(d) a second liquid outlet in said housing;

(e) at least one coalescing assembly for coalescing said first liquid wherein said at least one coalescing assembly comprises at least one coalescing element which includes a halocarbon polymer packing material which has a solid capture efficiency of as high as 20 μm, which is substantially chemically inert to corrosive liquids and which is adapted to separate liquids differing in interfacial tension of at least about 0.6 dynes/cm; and (f) a liquid separating region in said housing.

2. A coalescing element for coalescing a first liquid from a second liquid, in which the first liquid is a corrosive aqueous liquid that is wholly or partly immiscible in and forms a discontinuous phase with the second, continuous phase-forming organic liquid comprising the components: a porous, fibrous structure including fluorocarbon polymer fibers, end caps, core and a cage, each of the components being formed from materials which are highly resistant to corrosive liquids, wherein said fibrous structure has a solid capture efficiency of as high as about 20 μm and is adapted to separate liquids differing in interfacial tension of as low as about 0.6. dynes/cm.

3. A liquid purification system capable of separating a first liquid from a second liquid, in which the first liquid is a corrosive aqueous liquid that is wholly or partly immiscible in and forms a discontinuous phase with a second, continuous phase-forming organic liquid comprising the components:

(a) a housing;

(b) a fluid inlet in said housing;

(c) a first liquid outlet in said housing;

(d) a second liquid outlet in said housing;

(e) at least one coalescing assembly for coalescing said first liquid including at least one coalescing element which includes a halocarbon polymer packing material having a solid capture efficiency of as high as about 20 μm and is adapted to separate liquids differing in interfacial tension of as low as about 0.6 dynes/cm; and (f) a liquid separating region in said housing wherein each of the components is formed from materials which are highly resistant to corrosive liquids.

4. A liquid purification system capable of separating a first liquid from a second liquid, in which the first liquid is a corrosive aqueous liquid that is wholly or partly immiscible in and forms a discontinuous phase with a second, continuous phase-forming organic liquid comprising:

(a) a housing;

(b) a fluid inlet in said housing;

(c) a first liquid outlet in said housing;

(d) a second liquid outlet in said housing;

(e) at least one coalescing assembly for coalescing said first liquid wherein said at least one coalescing assembly comprises at least one coalescing element which includes a halocarbon polymer packing material that is substantially chemically inert to corrosive liquids, includes at least one porous, fibrous, non-woven web having a solid capture efficiency of as high as about 20 μm, and is adapted to separate liquids differing in interfacial tension of as low as 0.6 dynes/cm; and (f) a liquid separating region in said housing.

5. A coalescing element for coalescing a first liquid from a second liquid, in which the first liquid is a corrosive aqueous liquid that is wholly or partly immiscible in and forms a discontinuous phase with the second, continuous phase-forming organic liquid comprising a halocarbon polymer packing material which includes at least one porous, fibrous, non-woven web having a solid capture efficiency of as high as about 20 μm, and is adapted to separate liquids differing in interfacial tension of as low as 0.6 dynes/cm.

6. A liquid purification system according to claim 4 wherein said packing material comprises a fluorocarbon polymer.

7. A liquid purification system according to claim 4 wherein said packing material comprises a copolymer of ethylene and chlorofluoroethylene.

8. A liquid purification system according to claim 4 wherein said packing material comprises polytetrafluoroethylene.

9. A liquid purification system according to claim 4 wherein said packing material comprises polyvinylidene difluoride.

10. A liquid purification system according to claim 4 wherein said at least one coalescing assembly comprises a plurality of coalescing elements, each of which is arranged within said at least one coalescing assembly in parallel relationship.

11. A coalescing element according to claim 2 wherein said packing of said at least one coalescing element includes at least one porous fibrous, non-woven web.

12. A liquid purification system according to claim 4 wherein said at least one coalescing assembly comprises a plurality of coalescing elements.

13. A liquid purification system according to claim 4 wherein said liquid separating region comprises a gravity separation region.

14. A liquid purification system according to claim 4 wherein said liquid separating region comprises at least one separating element.

15. A coalescing element according to claim 2, further including a polymeric or metal mesh support sleeve and a metal support core, each of said fibrous structure, support sleeve and support core having a cylindrical configuration and concentric relationship, and end caps sealingly attached to said fibrous structure, support sleeve and support core.

16. A liquid purification system according to claim 4 wherein said packing comprises polytetrafluoroethylene fibers in a fluorinated ethylene propylene resin binder.

17. A liquid purification system according to claim 4 wherein each of the components is formed from materials which are highly resistant to corrosive liquids.

18. A liquid purification system according to claim 3 wherein said liquid separating region comprises a gravity separation region.

19. A liquid purification system according to claim 4 wherein said liquid separating region comprises a gravity separation region.

20. A coalescing element according to claim 5 wherein said packing material comprises a fluorocarbon polymer.

21. A coalescing element according to claim 5 wherein said packing material comprises a copolymer of ethylene and chlorotrifluoroethylene.

22. A coalescing element according to claim 5 wherein said packing material comprises polytetrafluoroethylene.

23. A coalescing element according to claim 5 wherein said packing material comprises polyvinylidene difluoride.

24. A liquid purification system according to claim 3 wherein said liquid separating region comprises at least one separating element.

\* \* \* \* \*

UNITED STATES PATENT AND TRADEMARK OFFICE
CERTIFICATE OF CORRECTION

PATENT NO. : 5,480,547
DATED : January 2, 1996
INVENTOR(S) : Williamson et al.

It is certified that error appears in the above-indentified patent and that said Letters Patent is hereby corrected as shown below:

Column 16, Line 11, change "chlorofluoroethylene"

to --chlorotrifluoroethylene--.

Signed and Sealed this

Twenty-fifth Day of June, 1996

Attest:

BRUCE LEHMAN

Attesting Officer     Commissioner of Patents and Trademarks